(12) United States Patent
Jenkins et al.

(10) Patent No.: US 11,366,324 B2
(45) Date of Patent: Jun. 21, 2022

(54) HELMET MOUNT FOR STOWAGE AND ADJUSTMENT OF HMD

(71) Applicant: BAE SYSTEMS plc, London (GB)

(72) Inventors: Jordan Henry Walker Jenkins, Rochester (GB); Martyn Ingleton, Rochester (GB)

(73) Assignee: BAE SYSTEMS plc, London (GB)

(*) Notice: Subject to any disclaimer, the term of this patent is extended or adjusted under 35 U.S.C. 154(b) by 367 days.

(21) Appl. No.: 16/629,160

(22) PCT Filed: Jul. 2, 2018

(86) PCT No.: PCT/GB2018/051852
§ 371 (c)(1),
(2) Date: Jan. 7, 2020

(87) PCT Pub. No.: WO2019/008334
PCT Pub. Date: Jan. 10, 2019

(65) Prior Publication Data
US 2020/0292831 A1    Sep. 17, 2020

(30) Foreign Application Priority Data

Jul. 7, 2017  (EP) ..................................... 17275100
Jul. 7, 2017  (GB) ..................................... 1710929

(51) Int. Cl.
*G02B 27/01*       (2006.01)
*A42B 3/04*        (2006.01)

(52) U.S. Cl.
CPC .......... *G02B 27/0176* (2013.01); *A42B 3/042* (2013.01); *G02B 2027/0154* (2013.01)

(58) Field of Classification Search
CPC .............. G02B 27/0176; G02B 27/017; G02B 2027/0154; A42B 3/042
See application file for complete search history.

(56) References Cited

U.S. PATENT DOCUMENTS 4,660,943 A * 4/1987 Ellis ....................... A42B 3/042
                                                     359/362
5,003,300 A   3/1991 Wells
                     (Continued)

FOREIGN PATENT DOCUMENTS

EP    0186394 A2    7/1986
WO    2006131558 A1  12/2006
WO    2019008334 A1   1/2019

OTHER PUBLICATIONS

International Search Report and Written Opinion received for PCT Application No. PCT/GB2018/051852. dated Sep. 27, 2018. 12 pages.

(Continued)

*Primary Examiner* — Bao-Luan Q Le
(74) *Attorney, Agent, or Firm* — Finch & Maloney PLLC

(57) ABSTRACT

A helmet mounting for optical combiner (50) for a HMD has a pivoted mounting arm (60) for the optical combiner to be movable between an operational position in a line of sight, and a retracted position displaced out of the line of sight. A translation mechanism (100) provides translation of the optical combiner along the line of sight. A driving lever (30) causes the displacement of the mounting arm between the line of sight and the retracted position, and with a second motion of the lever, causes the translation of the optical combiner. By having the same lever coupled to both the mounting arm and the translation mechanism, the relatively complex combination of displacement and translation movements of the optical combiner can be reduced to a simpler movement, easier for a user such as a pilot to use even when under stress in a busy and cramped cockpit environment.

20 Claims, 8 Drawing Sheets

(56) References Cited

U.S. PATENT DOCUMENTS

| | | | | |
|---|---|---|---|---|
| 5,471,678 | A * | 12/1995 | Dor | A42B 3/042 2/6.7 |
| 2002/0148032 | A1* | 10/2002 | Basson | A42B 3/32 2/6.2 |
| 2004/0181858 | A1* | 9/2004 | Soto | G02B 27/0176 2/448 |
| 2006/0007562 | A1* | 1/2006 | Willey | G02B 27/0149 359/811 |
| 2006/0174401 | A1* | 8/2006 | Prendergast | G02B 7/002 2/422 |
| 2007/0114252 | A1* | 5/2007 | Gruebel | A42B 3/04 224/181 |
| 2008/0263752 | A1* | 10/2008 | Solinsky | A42B 3/042 2/422 |
| 2009/0135505 | A1* | 5/2009 | Willey | G02B 23/125 359/815 |
| 2010/0180364 | A1* | 7/2010 | Willey | A42B 3/042 2/422 |
| 2010/0229288 | A1 | 9/2010 | Higgins | |
| 2012/0002046 | A1* | 1/2012 | Rapoport | G02B 27/0176 348/E7.091 |
| 2014/0327962 | A1* | 11/2014 | Teetzel | F41G 11/003 359/409 |
| 2015/0002930 | A1* | 1/2015 | Teetzel | G02B 23/18 359/409 |
| 2016/0085077 | A1* | 3/2016 | Milea | G02B 27/0149 359/632 |
| 2017/0176756 | A1* | 6/2017 | Takahashi | G02B 27/0176 |
| 2018/0180895 | A1* | 6/2018 | Pombo | G02B 27/0176 |

OTHER PUBLICATIONS

GB Search Report under Section 17(5) received for GB Application No. 1710929.9 dated Dec. 11, 2017. 3 pages.

Extended European Search Report received for EP Application No. 17275100.0, dated Jan. 11, 2018. 7 pages.

* cited by examiner

Path for Optics

HELMET MOUNT FOR STOWAGE AND ADJUSTMENT OF HMD

This disclosure relates to mounts for Helmet Mounted Displays (HMD) and is particularly, but not exclusively, relevant to mounts which can enable movement of the optical combiner parts of the HMD between stowage and operational positions.

HMDs utilise optical combiner including a transparent component, which the user looks through, to overlay an image on the user's actual view of the surroundings. The user's eye receives light from those surroundings in the normal way, and the user's eye also receives light from the display system. An image from the display is thus overlaid on the actual surroundings.

The transparent component of an HMD may be mounted pivotably between one position for stowage and another position for operation in the line of sight of the user. A fundamental requirement of an HMD is an optical combiner to couple light from an image source to the location required for viewing by the user where it is combined with the real world view. An image projection system projects an image into optical combiner such as a waveguide or prismatic eyepiece which couples the image to a user's eye positioned at the exit pupil of the system. The waveguide body is optically transmissive such that the user views the real world through the waveguide and the image from the projection system is overlaid onto that view. optical combiner It is desirable for the image displayed to the user (i.e at the exit pupil) to be focussed a long way from the eye (infinity), since this is the likely focus distance of the real world image onto which the projected image is overlaid.

It is known to provide a mount for the optical combiner which has an arm which pivots about a pivot at one or both sides of the helmet. This provides essentially up/down movement to an operational position in a line of sight. A mechanism is provided to enable adjustment of the optical combiner along the line of sight to achieve the correct spacing from the eyes, typically 2-3 cm. Typically a user such as an aircraft pilot has to adjust the position carefully to be able to use the HMD. The mounting needs to be stiff to avoid vibration, and yet be easily adjustable, even when a pilot is under stress in a busy and cramped cockpit environment. In many cases it needs to be extremely lightweight, so that it does not put too much load on a user's neck during use or in emergency situations such as operation of an ejector seat.

There is therefore a need for a helmet mounting providing improved performance without compromising on these various specifications.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a helmet mounting for optical combiner for an HMD, comprising: a mounting arm movable about a pivot on the helmet, for supporting the optical combiner to be movable between an operational position in a line of sight of the user, and a retracted position in which the optical combiner is displaced out of the line of sight. There is also a translation mechanism for providing translation of the optical combiner relative to the eye of the user, along the line of sight, and a driving lever coupled to the mounting arm and to the translation mechanism. This is arranged so as to cause, with a first motion of the lever, movement of the mounting arm between the line of sight and the retracted position, and with a second motion of the lever, to cause the translation mechanism to provide the translation of the optical combiner along the line of sight.

Other features may be added in particular embodiments, such as the driving lever being arranged to rotate around the pivot, so that the first motion comprises rotation of the lever around the pivot, with the rotation of the lever causing the rotation of the mounting arm about the pivot to cause the optical combiner to move between the retracted position and the operational position.

Another such additional feature is the second motion comprising a further rotation of the lever around the pivot, in which the lever disengages at least partly from the mounting arm to cause the translation without corresponding displacement of the optical combiner. Another such feature is the translation mechanism comprising a translatable mounting for the optical combiner on the mounting arm so as to allow translation of the optical combiner relative to the mounting arm.

Another such additional feature is the translation mechanism comprising a converter for converting the second motion of the driving lever into a translation of the optical combiner relative to the mounting arm. Another such additional feature is the converter comprising a crank and coupling rod coupled between the driving lever and the optical combiner, for converting a rotation of the handle into the translation. Another such additional feature is the translatable mounting of the optical combiner on the mounting arm further comprising a parallel linkage.

Another such additional feature is the mounting arm comprising a lock for releasably locking the mounting arm in the operational position. In some embodiments, the lock is coupled to the translatable mounting so that a translation towards the eyes of the user enables the lock to engage, and a translation away from the eyes releases the lock. In some embodiments there is a sensor mount on the mounting arm, in alignment with the optical combiner. In some embodiments, there is a retraction lock for locking the mounting arm in the retracted position. In some embodiments, the mounting arm comprises a beam extending in essentially a semi circle between pivots at both sides of the helmet, so that the retracted position is above the line of sight. Another such additional feature is the coupling rod comprising a beam extending in an essentially quarter-circle arc from the crank at the pivot, to the translatable mounting for the optical combiner.

Another aspect provides a helmet having the helmet mounting having features as set out above.

BRIEF DESCRIPTION OF THE DRAWINGS

Embodiments of the invention will be described, by way of example, with reference to the following drawings, in which.

DETAILED DESCRIPTION

Figure 1:
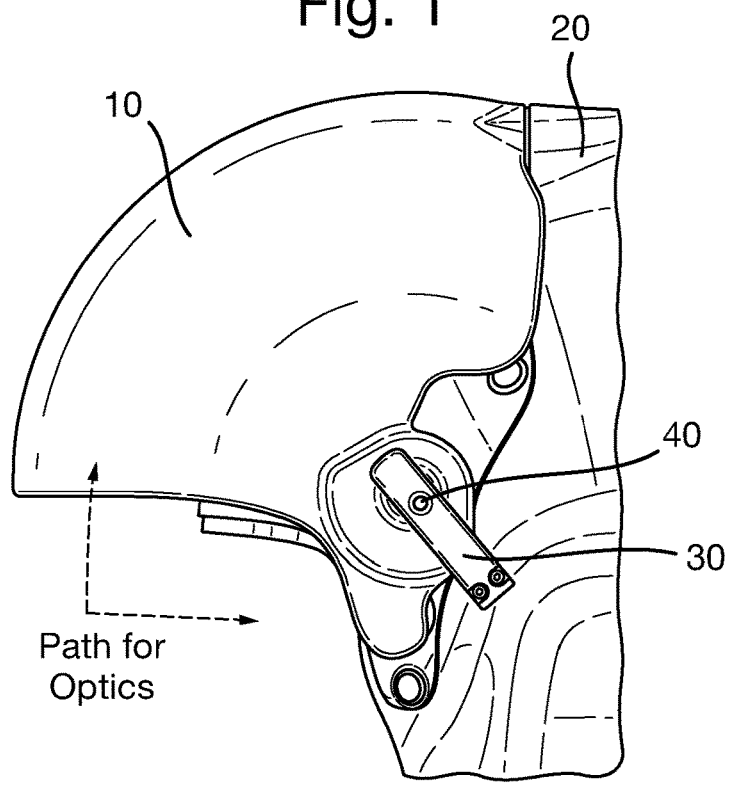
FIG. 1 shows a side view of a helmet having a mounting according to an embodiment, in a retracted position.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

FIGS. 1 to 8 show various views in the form of schematic diagrams of a helmet having a helmet mounting according to an embodiment. The embodiment shows a display which has optical combiner in the form of binocular eyepieces, though it could be applied to a monocular version. The optical combiner usually need to be located at close proximity to the eyes. This proximity would complicate taking the helmet off or putting it on, and can obscure the field of vision when the optical display is not required. Moving the optical combiner between an operational position in the line of sight, near the eyes, and a retracted position away from the line of sight involves guidance along a complex path to achieve optimal stowage and smooth redeployment when needed. The mechanism of the embodiment shown has a number of features which will now be described.

There is a mounting arm movable about a pivot on the helmet, for supporting the optical combiner to be movable between an operational position in a line of sight of the user, and a retracted position in which the optical combiner is displaced out of the line of sight. A translation mechanism provides translation of the optical combiner relative to the eye of the user, when the mounting arm is in the line of sight. A driving lever is coupled to the mounting arm and to the translation mechanism, so as to cause, with a first motion of the lever, movement of the mounting arm between the operational position and the retracted position, and with a second motion of the lever, to cause the translation mechanism to provide the translation of the optical combiner along the line of sight.

By having the same lever coupled to both the mounting arm and the translation mechanism, the relatively complex combination of displacement and translation movements of the optical combiner can be reduced to a simpler movement action of a driving lever for the user. No longer does the user have to find and fiddle with separate adjustment levers. This combination makes it easier for a user such as a pilot to use the HMD even when under stress in a busy and cramped cockpit environment. It can help to keep the exterior of the helmet clearer so there are fewer items protruding. If the movement is servo driven, this combination makes it easier to have a single servo for both movements, thus reducing weight and complexity.

Particular implementations can be arranged where the retracted position is above the line of sight, in which case the path for the optical combiner is first in a forward direction away from the eyes then once the brim of the helmet is cleared, the path becomes upward along the arc of the helmet to clear the field of view of the user. When in the operational position, it is useful to be able to adjust the linear distance from the eyes of the user to adapt to different head sizes and helmet sizes. Some embodiments can have a sensor mount in alignment with the optical combiner, suitable for mounting a sensor such as a camera, or helmet position tracker for example. The mechanism can be applied to cases in which such a sensor is not needed, but if needed, the sensor mount can help avoid the additional complexity of a separate mount, and alignment process for the sensor. Some embodiments have a lock for locking the optical combiner in the operating position, while allowing for positional adjustment. This lock can help prevent unwanted displacement out of the line of sight, while the optical combiner is under the brim of the helmet, and yet allow such displacement once the optical combiner is clear of the brim. This can prevent the optical combiner from fouling the brim, and help guide the optical combiner around a corner in its path to or from the retraction position. It may also help ensure correct positioning in the line of sight, and provide stability in the operating position against shock and accelerations.

A lock may be provided for locking the optical combiner in the retracted position, for example using a cam interlock.

The same lever can be used for movement along the line of sight and the displacement in or out of the line of sight, and this may be situated conveniently to one side of the helmet or conceivably duplicated on both sides of the helmet. The lever may be located at the pivot or elsewhere away from the pivot. By locating it at the pivot, the mechanism can be kept simple, and any cover for the mechanism can be fitted around a lever at the pivot more easily than around a lever that is elsewhere that might need a slot in the cover for example. In implementing the mechanism, there is typically a need to keep the components very light so as to maintain balance of the helmet. The components should be as stiff as possible to provide stable support and alignment. In particular, where there is a camera providing the display, there needs to be accurate alignment of the optical combiner with the line of sight of the camera, to maintain registration of the display with the real world view in the user's field of view.

Figure 2:
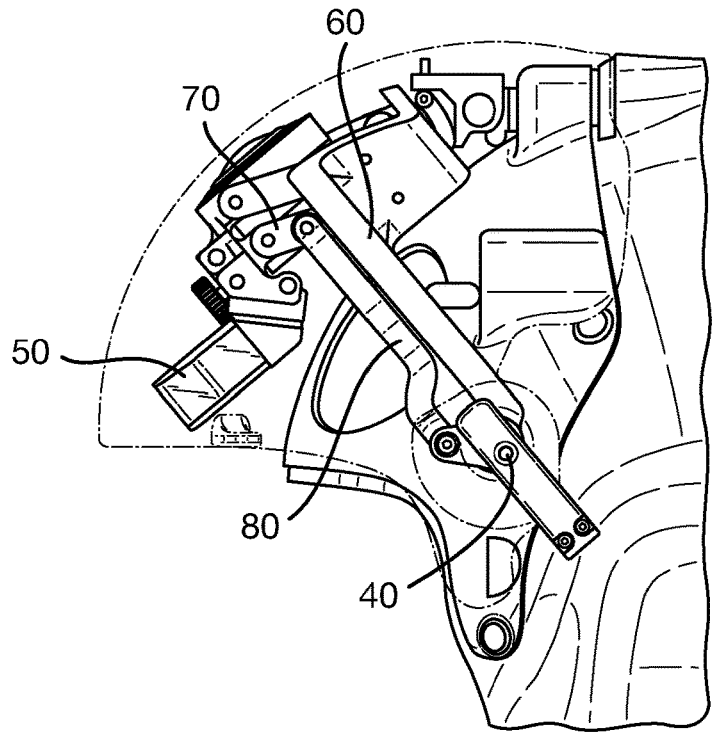
FIG. 2 shows a similar view but with a transparent cover.

FIG. 1 shows a schematic view of an embodiment showing a helmet 20 having a cover 10, concealing the helmet mount in a retracted position above a brim of the helmet. The driving lever is shown in the form of a handle 30 at one side of the helmet and movable by rotating manually around a pivot 40. In FIG. 2, a similar view is shown, but with the cover made transparent so that the helmet mount can be seen, with the optical combiner 50 in the retracted position. The optical combiner is mounted on the mounting arm 60 by means of a translation mechanism 70. The mounting arm is pivoted around pivot 40. The translation mechanism allows for the translation towards or away from the eyes and includes a coupling rod 80 coupled to cause the translation motion of the optical combiner towards the eye when the handle is turned further, as will be described in more detail with reference to subsequent figures. A dotted line arrow shows the path of the optical combiner between operational position in front of the eyes and retracted position away from the eyes and up out of the field of view.

Figure 3:
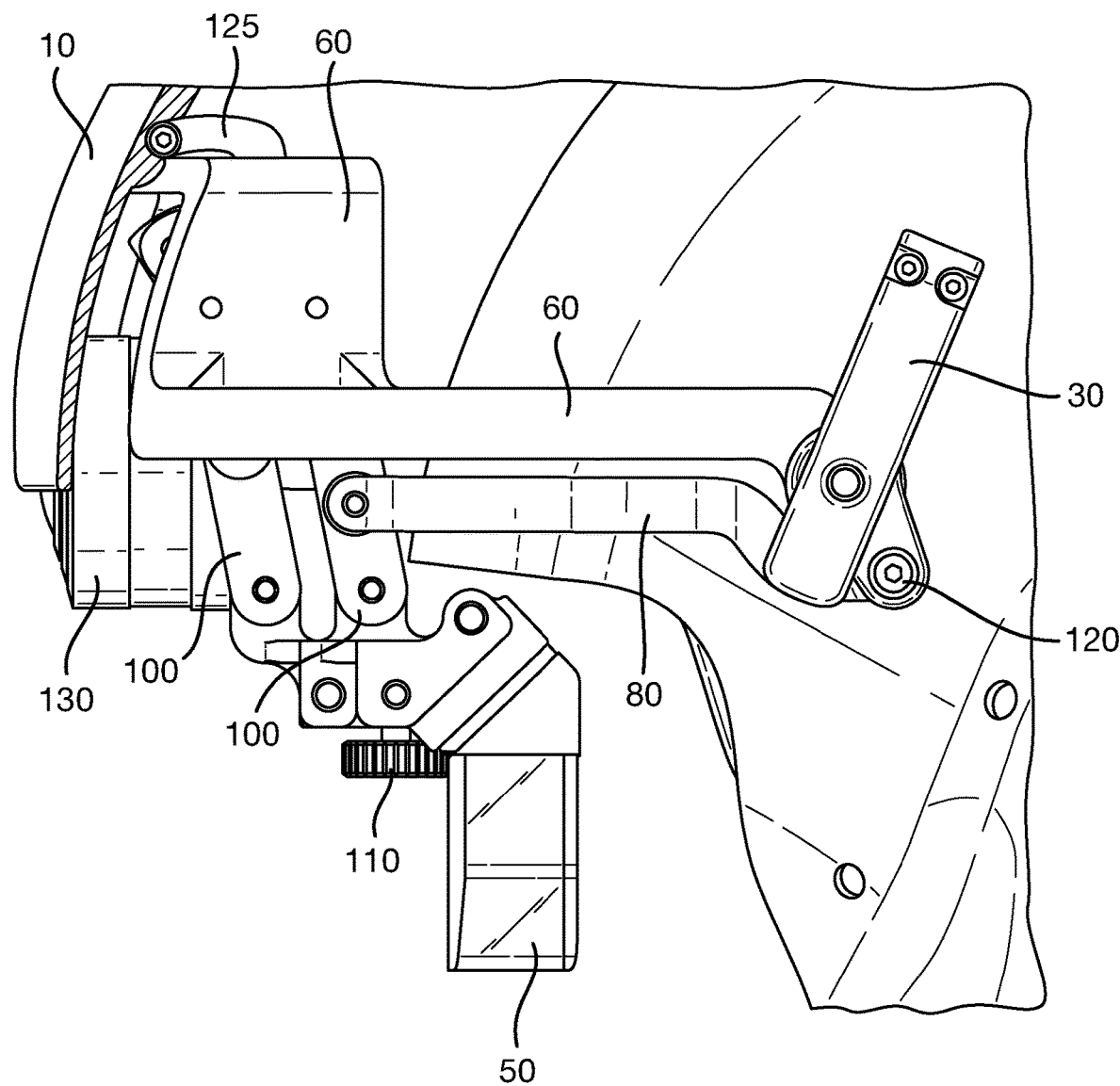
FIGS. 3 to 6 show similar views in a sequence of different positions.

FIGS. 3 to 6 show close up side views of the helmet mount with the cover cut away, showing different positions in a sequence from operational position, to operational adjustment, to partial retraction, to fully retracted position respectively. In FIG. 3, the optical combiner are shown in an operational position, close to the eye. The translation mechanism which supports the optical combiner is formed of a parallel motion linkage mechanism having two parallel arms 100, pivoted at their bottom on the structure of the optical combiner, and pivoted at their top on part of the mounting arm. One of the parallel arms is coupled by a pivot to a left hand end of coupling rod 80. Lateral movement of this coupling rod will cause the parallel arms to move essentially along the line of sight towards or away from the eyes. Hence the optical combiner can be moved along the line of sight. The motion is not quite a straight line as it describes a small part of an arc, but provided the parallel arms are long enough it is near enough straight along the line of sight. If a single arm were provided in place of the parallel arms, the translation motion could be achieved, but the alignment of the optical combiner would change. Hence this option would be conceivable, if there is no fore/aft translation adjustment, or if this adjustment is provided by a separate mechanism. By providing the parallel linkage, the same mechanism which is used to retract the optical combiner, can also be used to provide adjustment of operating position along the line of sight, while maintaining the alignment of the optical combiner. Another option is to provide a suitable linear guide, which might use sliders (which has a drawback of more friction, or rollers (to reduce the friction, but which adds complexity).

There is an adjustment wheel 110 shown on the optical combiner mounting, but this is for adjusting the mutual separation of the two eyepieces of binocular optical combiner, and so is not used for adjusting the distance from the eye. The translation motion is driven by the connecting rod, which is coupled at its right hand end to a crank 120, which can rotate around the pivot 40, driven by the rotation of the handle. This is a relatively simple and robust way of converting rotation of the handle into the translation of the optical combiner. Other ways can be conceived in principle, such as having a sliding motion of the handle, or a twisting motion converted by a worm drive into the translation.

Note that the handle is arranged to rotate clockwise from the near vertical position shown in FIG. 3 for the above mentioned second motion while disengaged from the mounting arm, to enable the translation of the optical combiner along the line of sight away from the eyes, with little or no displacement perpendicular to the line of sight. In principle it is not always essential that the mounting arm be completely disengaged from the handle for this part, it could be implemented so that there is some up/down displacement of the mounting arm, for example downwards to avoid the helmet brim, by any suitable guide mechanism.

Note that a locking cam 125 is provided for engaging with a corresponding recess in the helmet cover 10 for example, to prevent up/down displacement of the optical combiner during the translation. This can be coupled to the parallel linkage or other parts for example so as to engage or disengage when desired, as will be described in more detail below with reference to FIG. 7. This is an example of the mounting arm comprising a lock for releasably locking the mounting arm in the operational position. The lock can be coupled to the translatable mounting so that a translation towards the eyes of the user enables the lock to engage, and a translation away from the eyes releases the lock. An advantage is that this can help ensure the up/down displacement in or out of the line of sight only takes place when the translation is far enough away from the eyes to clear the brim of the helmet. This also provides a way of configuring the mechanism to suit different sizes or different designs of helmet, by altering the point in the translation at which the lock engages.

Also shown is a sensor in the form of a camera 130, on a sensor mount on the mounting arm, so as to have a parallel line of sight to that of the user and the optical combiner. The camera therefore retracts under the helmet cover as the mounting arm is rotated into the retracted position.

Figure 4:
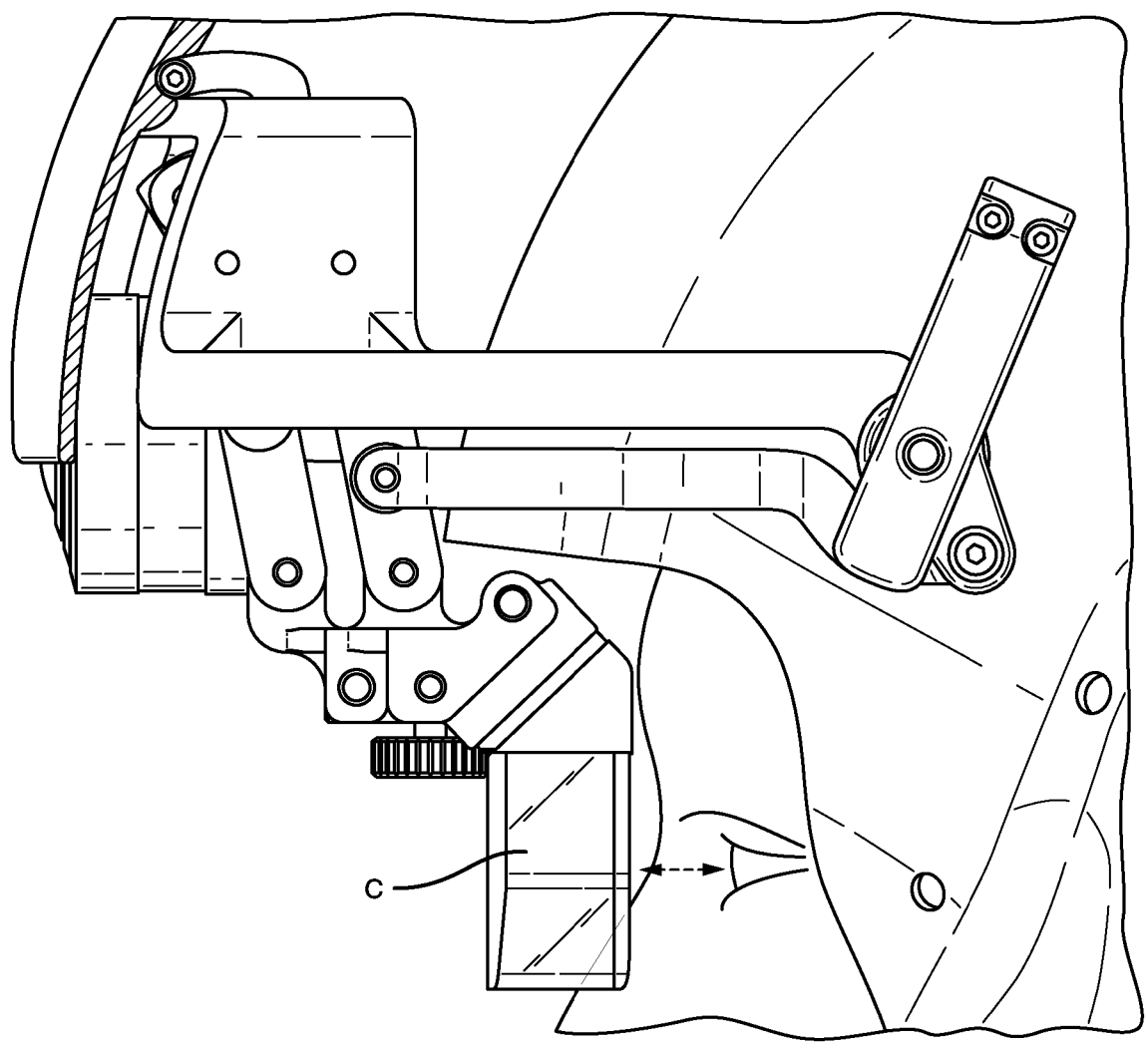

FIG. 4 shows a similar view to that of FIG. 3, to illustrate an adjustment step c). It shows outlines of a user's face with a dotted line arrow showing a distance from the optical combiner to the user's eye. By making small rotations of the handle, this distance can be adjusted. As explained above, the rotation of the handle causes the coupling rod to move without rotating the mounting arm. This causes the parallel linkage to move which causes the translation of the optical combiner, to adjust the distance to the eye, while maintaining the alignment of the optical combiner along the line of sight, and avoiding perpendicular displacement of the optical combiner.

Figure 5:
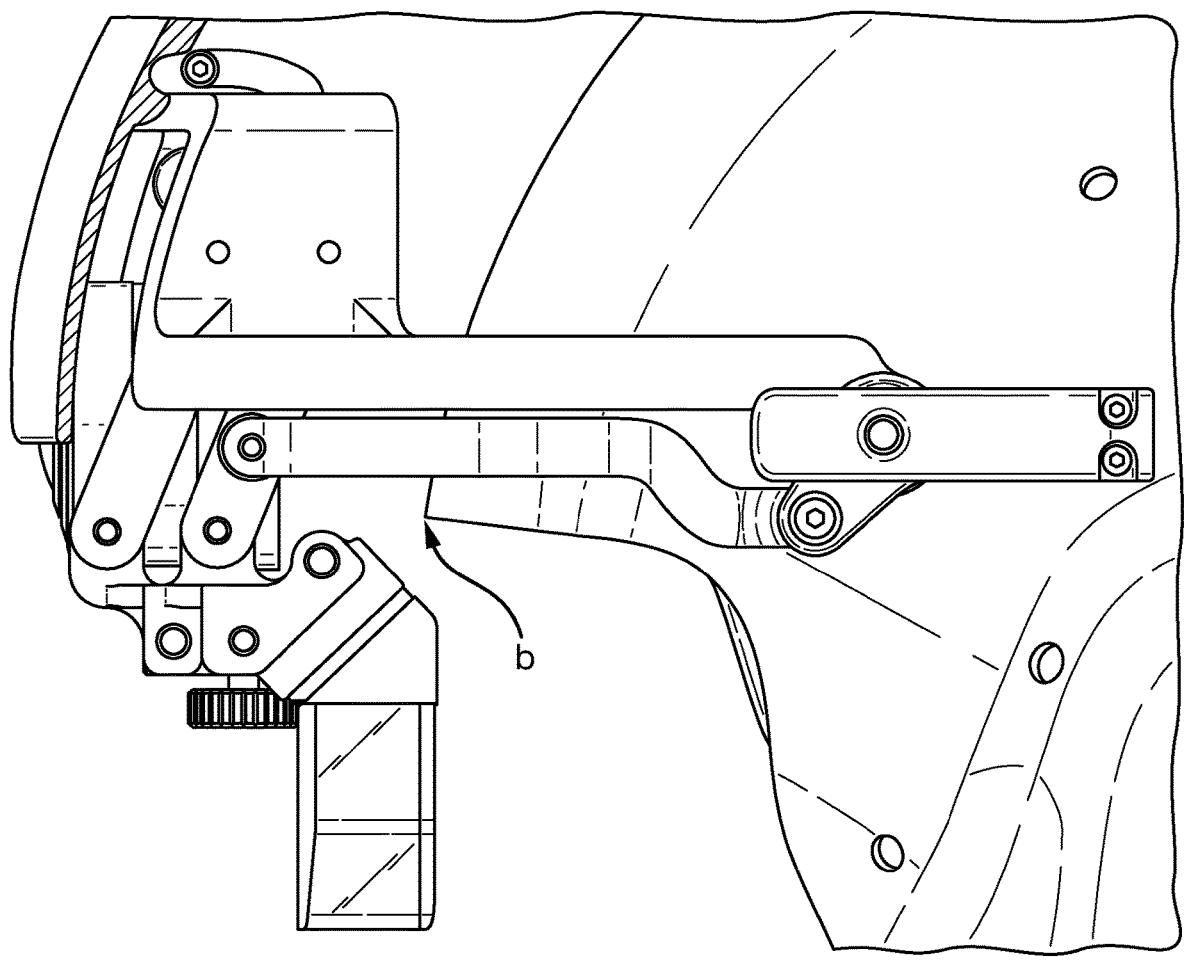

FIG. 5 shows a similar view to that of FIGS. 3 and 4, but after completion of the above mentioned second motion of the handle. Now the optical combiner are far enough away from the eyes along the line of sight to be clear of the brim, shown by arrow (b), ready for displacement movement up and out of the line of sight. The handle has been rotated to a substantially horizontal position and is about to engage the mounting arm. This engagement can be achieved for example by a pin on the left hand (shorter) end of the handle (the pin would be underneath and so hidden from view in these figures). Note that the locking pin 125 has now retracted out of its locking recess, so the mounting arm is free to rotate upwards.

Figure 6:
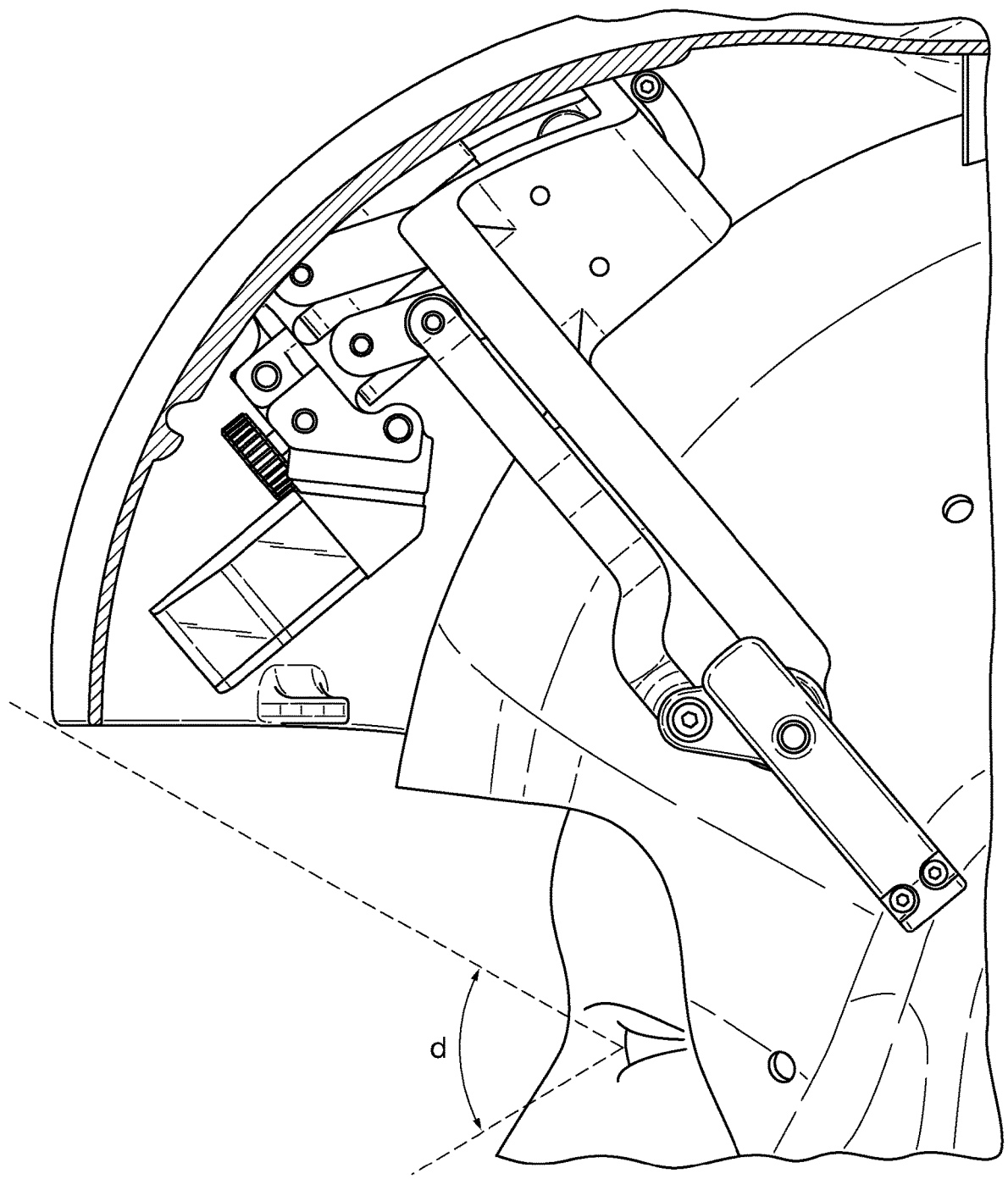

FIG. 6 shows a similar view to that of FIGS. 3, 4 and 5, but with the optical combiner and camera in the fully retracted position. Now the optical combiner and camera are clear of the field of view of the user, shown by angle (d). The handle has completed the above mentioned first motion, by having been rotated clockwise approximately 45° further than before, the handle has engaged with the mounting arm and rotated that also through approximately 45°. The crank 120 has continued to rotate with the handle, but as the mounting arm has also rotated, there has been no relative motion between the mounting arm and the connecting rod, therefore no translation of the parallel linkage and therefore no translation of the optical combiner and camera.

Figure 7:
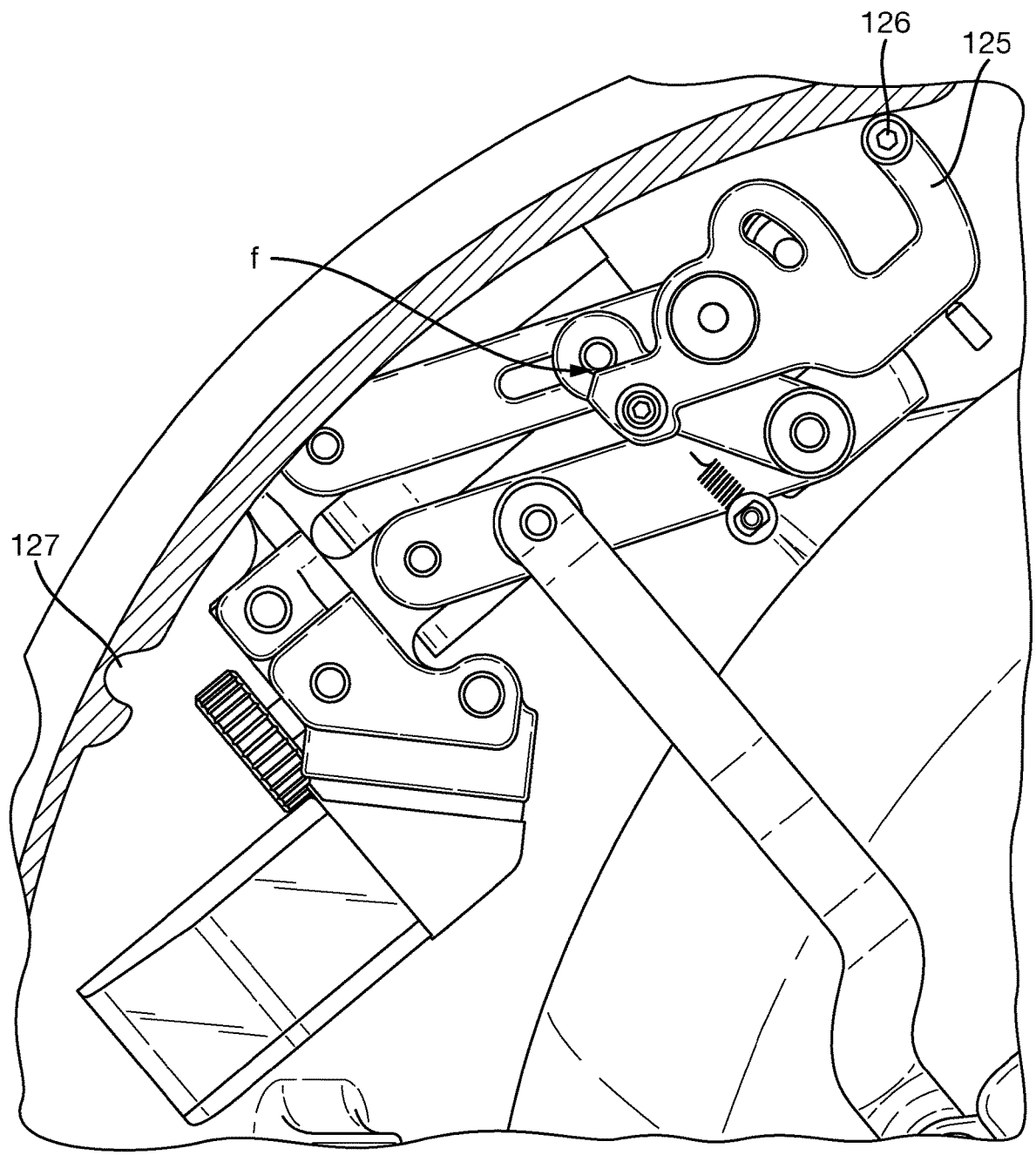
FIG. 7 show a similar view with cut away to show more detail of locking mechanism.

FIG. 7 shows a similar view to those of FIGS. 3 to 6, but with some of the mounting arm cut away to reveal more of the locking mechanism denoted by (f). A locking mechanism can be provided for locking in the operational position, and a retraction locking mechanism can be used to lock the mounting releasably in the retracted position, for example by means of a cam follower lock. These locks can provide stability for the optical combiner in the deployed and retracted (stowed) positions. In the stowed position the roller 126 on lever 125 engages with a track on the inner surface of the helmet shell to constrain any translation towards the user. This is one way of preventing the optical combiner dropping against the inner helmet, other ways can be envisaged. When the optical combiner is deployed by moving it towards the operational position, the roller 126 on lever 125 locks into a feature notch 127 at the bottom of the track which secures the optical combiner from vertical movements. The cam follower lock holds the optical combiner away from the inner helmet and locks the mounting arm in the deployed horizontal attitude once the optical combiner is drawn aft under the inner helmet brim by the driving lever. There can be a friction device built into the lever pivot 30 so that the mounting arm for the optical combiner stops rotating at a set point. There can be balance springs attached to the mounting arm to help raise the optical combiner into the retraction position, where the optical combiner is in a stowage volume. At full retraction there can be a detent or positive locking device to hold the position against vertical "g" loading of flight for example.

Figure 8:
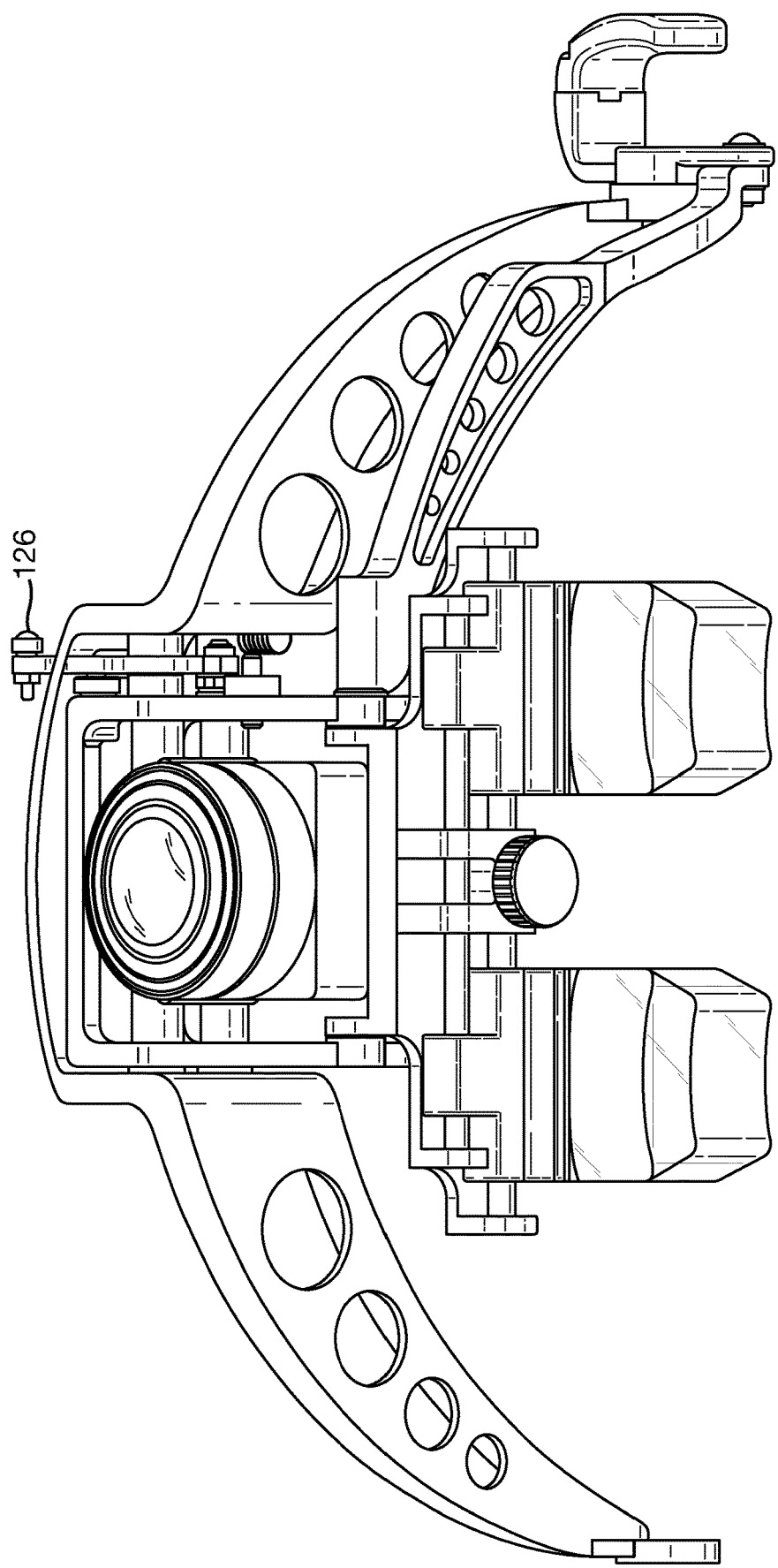
FIG. 8 shows a three quarter view of a mounting without the helmet, according to an embodiment.
Figure 9:
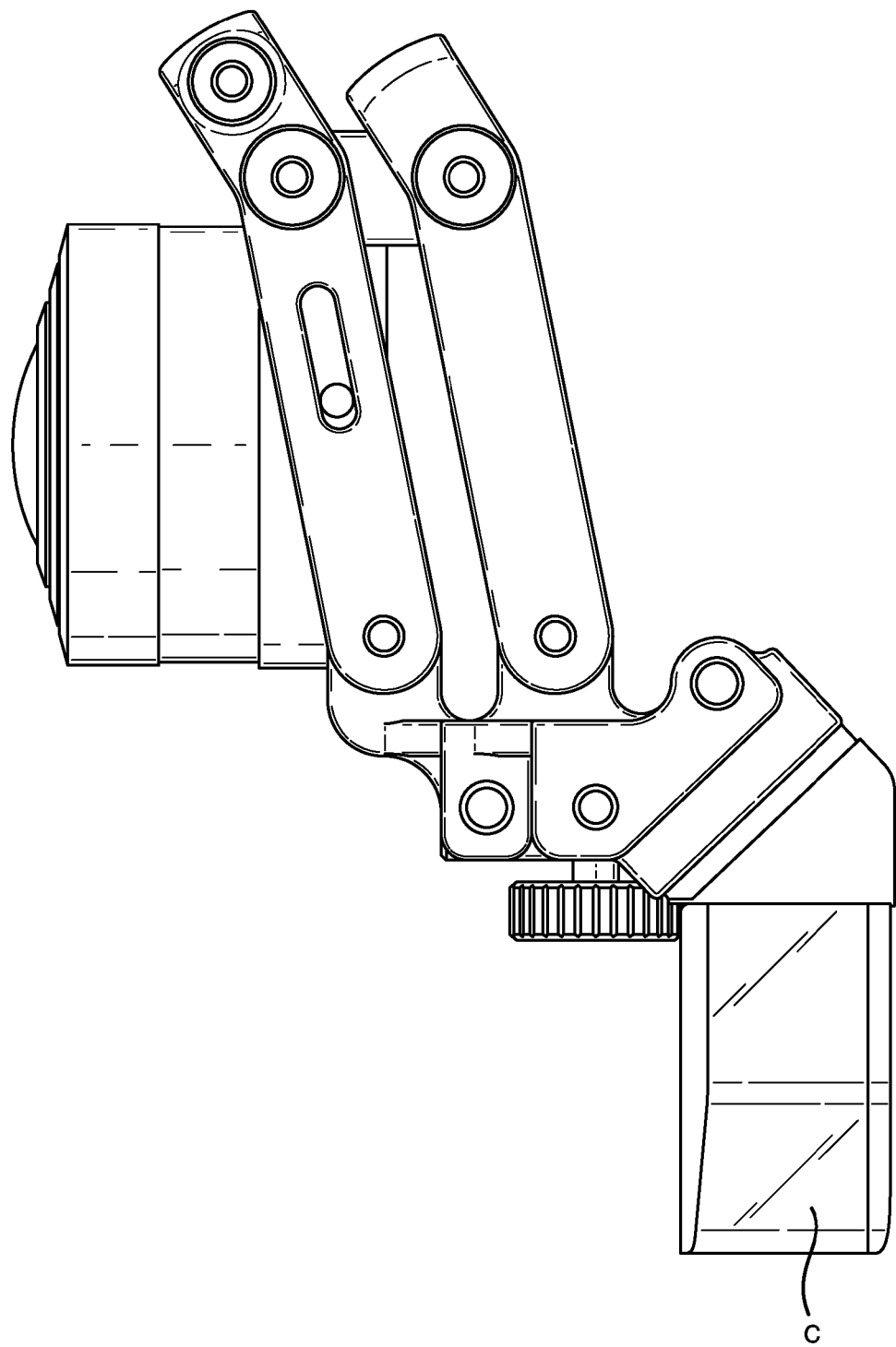
FIG. 9 shows a side view of detail of a parallel linkage for the embodiments.

FIG. 8 shows a three-quarter view of the helmet mounting without the helmet or helmet cover, from in front and below. The binocular eyepieces become more clearly visible, as can the adjustment wheel for adjusting mutual separation. The mounting arm is shown as extending essentially in a semi circular arc between pivots, and having a shaped profile with a central web having holes cut out to improve stiffness to weight ratio. It also shows an increasing width away from the pivots, again for more stiffness where needed, and shows the mounting arm being shaped to fit around the camera. The handle and the coupling rod are shown on the right hand side only. The camera is mounted centrally, and there are parallel motion linkages on either side of the camera to support the optical combiner and enable the translation. These parallel linkages are shown in side view in FIG. 9. The camera is fixed to a mount on the mounting arm, part of the mounting arm forms the top bar of the parallel linkage, and the optical combiner is fixed to the bottom bar.

The embodiments described have shown an example combining features such as a mechanism to transport the optical combiner from the stowed to deployed position using a single lever operation, so that when stowed the optical combiner is out of the user's line of sight, and providing fore/aft translation to enable the user to set the optimal optical combiner to eye distance. Other features which can be combined, and which have been described, include locks provided to secure the optical combiner against service loading such as shock and accelerations. The mechanism can be made up of pivots and parallel motion geometries to guide the motion and provide alignment stability to other sensors fitted to the helmet such as cameras, positional tracking systems etc. The frame can be a low mass construction to reduce user neck loading.

The embodiments described have shown a driving lever in the form of a handle arranged to rotate around the pivot, so that the first motion comprises rotation of the lever around the pivot, with the rotation of the lever causing the rotation of the mounting arm about the pivot to cause the optical combiner to move between the retracted position and the operational position. An advantage of the lever being located at the pivot and being rotational are ease of use and being out of the way, though other possibilities for location and for types of motion are envisaged.

In some embodiments the second motion has been shown as comprising a further rotation of the lever around the pivot, in which the lever disengages at least partly from the mounting arm to cause the translation without displacement of the optical combiner. An advantage of such further rotation is ease of use and simplicity of mechanism but again other possibilities for second motion while still using same lever can be envisaged, for example flip-over or twist actions.

In some embodiments, the translation mechanism has been shown as comprising a translatable mounting for the optical combiner on the mounting arm so as to allow translation of the optical combiner relative to the mounting arm. This is an alternative to the possibility of the translation involving translating the entire mounting arm. An advantage of not needing to translate the entire mounting arm is simplicity of mechanism and rigidity of the mounting arm.

In some embodiments, the translation mechanism has been shown as comprising a converter such as a crank and coupling rod for converting the second motion of the driving lever into a translation of the optical combiner relative to the mounting arm. This has an advantage of being a convenient way to control the translation while maintaining rigidity of the mounting of the optical combiner.

In some embodiments, the translatable mounting of the optical combiner on the mounting arm has been shown in the form of a parallel motion linkage. This has advantages such as being less prone to friction than a sliding mount for example, while retaining tight control of the orientation of the optical combiner through the translation. This orientation is particularly important if the HMD is showing features of the landscape ahead, which need to be aligned with the actual landscape. Although it results in an arcuate path rather than a straight line translation, this is not a problem if the parallel arms of the linkage are sufficiently long.

Embodiments described have shown other features including the camera mounted on the mounting arm, in alignment with the optical combiner, or the retraction lock for locking the mounting arm in the retracted position, or the mounting arm comprising a beam extending in essentially a semi circle between pivots at both sides of the helmet, so that the retracted position is above the line of sight. This retracted position can encompass various possible positions above the deployed position including partially in the field of view or fully out of the field of view. Also shown in the examples described is the coupling rod comprising a beam extending in an essentially quarter-circle arc from the crank at the pivot, to the translatable mounting for the optical combiner.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A helmet mounting for an optical combiner for a helmet mounted display, the helmet mounting comprising:
   a mounting arm movable about a pivot on the helmet, for supporting the optical combiner to be movable between an operational position in a line of sight of the user, and a retracted position in which the optical combiner is displaced out of the line of sight;
   a translation mechanism for providing translation of the optical combiner along the line of sight; and
   a driving lever coupled to the mounting arm and to the translation mechanism, so as to cause, with a first motion of the lever, movement of the mounting arm between the line of sight and the retracted position, and with a second motion of the lever, to cause the translation mechanism to provide the translation of the optical combiner along the line of sight.

2. The helmet mounting of claim 1, wherein the driving lever is arranged to rotate around the pivot, so that the first motion comprises rotation of the lever around the pivot, with the rotation of the lever causing the rotation of the mounting arm about the pivot to cause the optical combiner to move between the retracted position and the operational position.

3. The helmet mounting of claim 1, wherein the second motion comprises a rotation of the lever around the pivot, in which the lever is disengaged at least partly from the mounting arm to allow the translation to occur without corresponding displacement of the optical combiner.

4. The helmet mounting of claim 1, wherein the translation mechanism comprises a translatable mounting for the optical combiner on the mounting arm so as to allow translation of the optical combiner relative to the mounting arm.

5. The helmet mounting of claim 4, the translation mechanism comprising a converter for converting the second motion of the driving lever into the translation of the optical combiner relative to the mounting arm.

6. The helmet mounting of claim 5, the converter comprising a crank and coupling rod coupled between the driving lever and the optical combiner, for converting a rotation of the driving lever into a translation motion.

7. The helmet mounting of claim 1, wherein the translation mechanism comprises a translatable mounting for the optical combiner on the mounting arm so as to allow translation of the optical combiner relative to the mounting arm, the translatable mounting of the optical combiner on the mounting arm further comprising a parallel motion linkage.

8. The helmet mounting of claim 1, the mounting arm comprising a lock for releasably locking the mounting arm in the operational position.

9. The helmet mounting of claim 8, wherein the translation mechanism comprises a translatable mounting for the optical combiner on the mounting arm so as to allow translation of the optical combiner relative to the mounting arm, the lock being coupled to the translatable mounting so that a translation towards the eyes of the user enables the lock to engage, and a translation away from the eyes releases the lock.

10. The helmet mounting of claim 1, further comprising a sensor mount on the mounting arm, in alignment with the optical combiner.

11. The helmet mounting of claim 1, further comprising a retraction lock for locking the mounting arm in the retracted position.

12. The helmet mounting of claim 1, the mounting arm comprising a beam extending in essentially a semi circle between pivots at both sides of the helmet, so that the retracted position is above the line of sight.

13. The helmet mounting of claim 1, wherein:
the translation mechanism comprises a translatable mounting for the optical combiner on the mounting arm so as to allow translation of the optical combiner relative to the mounting arm;
the translation mechanism further comprises a converter for converting the second motion of the driving lever into the translation of the optical combiner relative to the mounting arm;
the converter comprises a crank and coupling rod coupled between the driving lever and the optical combiner, for converting a rotation of the driving lever into a translation motion; and
the coupling rod comprises a beam extending in an essentially quarter-circle arc from the crank at the pivot, to the translatable mounting for the optical combiner.

14. A helmet having the helmet mounting of claim 1.

15. A helmet mounting for an optical combiner for a helmet mounted display, the helmet mounting comprising:
a mounting arm movable about a pivot on the helmet, for supporting the optical combiner to be movable between an operational position in a line of sight of the user, and a retracted position in which the optical combiner is displaced out of the line of sight;
a translation mechanism for providing translation of the optical combiner along the line of sight, wherein the translation mechanism comprises a translatable mounting for the optical combiner on the mounting arm so as to allow translation of the optical combiner relative to the mounting arm; and
a driving lever coupled to the mounting arm and to the translation mechanism, so as to cause, with a first motion of the lever, movement of the mounting arm between the line of sight and the retracted position, and with a second motion of the lever, to cause the translation mechanism to provide the translation of the optical combiner along the line of sight, wherein the driving lever is arranged to rotate around the pivot, so that the first motion comprises rotation of the lever around the pivot, with the rotation of the lever causing the rotation of the mounting arm about the pivot to cause the optical combiner to move between the retracted position and the operational position.

16. The helmet mounting of claim 15, wherein the second motion comprises a rotation of the lever around the pivot, in which the lever is disengaged at least partly from the mounting arm to allow the translation to occur without corresponding displacement of the optical combiner.

17. The helmet mounting of claim 15, the translation mechanism comprising a converter for converting the second motion of the driving lever into the translation of the optical combiner relative to the mounting arm, the converter comprising a crank and coupling rod coupled between the driving lever and the optical combiner, for converting a rotation of the driving lever into a translation motion.

18. The helmet mounting of claim 15, the translatable mounting of the optical combiner on the mounting arm further comprising a parallel motion linkage.

19. A helmet mounting for an optical combiner for a helmet mounted display, the helmet mounting comprising:
a mounting arm movable about first and second pivots at respective sides of the helmet, for supporting the optical combiner to be movable between an operational position in a line of sight of the user, and a retracted position in which the optical combiner is displaced out of the line of sight, the mounting arm comprising a beam extending between the first and second pivots, so that the retracted position is above the line of sight;
a translation mechanism for providing translation of the optical combiner along the line of sight; and
a driving lever coupled to the mounting arm and to the translation mechanism, so as to cause, with a first motion of the lever, movement of the mounting arm between the line of sight and the retracted position, and with a second motion of the lever, to cause the translation mechanism to provide the translation of the optical combiner along the line of sight.

20. The helmet mounting of claim 19, further comprising:
a lock for releasably locking the mounting arm in the operational position, wherein the translation mechanism comprises a translatable mounting for the optical combiner on the mounting arm so as to allow translation of the optical combiner relative to the mounting arm, the lock being coupled to the translatable mounting so that a translation towards the eyes of the user enables the lock to engage, and a translation away from the eyes releases the lock; and a retraction lock for locking the mounting arm in the retracted position.

\* \* \* \* \*